US005456779A

United States Patent [19]

Sinha

[11] Patent Number: 5,456,779

[45] Date of Patent: Oct. 10, 1995

[54] METHOD OF ATTACHING ANTENNA MESH

[75] Inventor: Ajit K. Sinha, Fremont, Calif.

[73] Assignee: Lockheed Missiles & Space Company, Inc., Sunnyvale, Calif.

[21] Appl. No.: 266,131

[22] Filed: Jun. 27, 1994

[51] Int. Cl.[6] .............................. B32B 7/04; H01Q 15/16

[52] U.S. Cl. .............................................. 156/91; 343/912

[58] Field of Search ................................ 156/91, 92, 93; 343/840, 897, 912, 916, 915; 29/600

[56] References Cited

U.S. PATENT DOCUMENTS

| | | | |
|---|---|---|---|
| 3,832,717 | 8/1974 | Taggart, Jr. | 343/840 |
| 4,378,561 | 3/1983 | Hibbard | 343/912 |
| 4,609,923 | 9/1986 | Boan et al. | 343/897 |
| 4,648,124 | 3/1987 | Mantovani et al. | 455/67 |
| 4,766,443 | 8/1988 | Winegard | 343/840 |
| 4,812,854 | 3/1989 | Boan et al. | 343/897 |

*Primary Examiner*—Michael W. Ball
*Assistant Examiner*—David W. Reed
*Attorney, Agent, or Firm*—Feix & Feix; John J. Morrissey; H. Donald Volk

[57] ABSTRACT

An open mesh material for use as a high performance RF reflective antenna surface and which is formed as a Leno type weave using electrically conductive composite yarns which have a construction for avoiding loose metal-to-metal contacts which generate undesirable passive intermodulation products (PIM). The composite yarns are formed by counter-wrapping stretch resistant nonconductive strands about an insulated metal strand and a stretch resistant nonconductive filler yarn. The insulated metal strand preferably includes a beryllium-copper wire which is encapsulated within a polyamide coating. The woven mesh is coated with a RF energy transparent silicone-based paint to provide additional insulation to the plastic coated wires at the weave junctions and has a surface resistivity sufficiently low to facilitate bleed off of building electro-static charges. A method for cutting the mesh material into gore shaped reflector panels is also disclosed whereby the cut strands of the mesh panels are kept at a minimum distance spacing away from one another so as to prevent the formation of loose metal-to-metal contacts known to cause PIM. An improved PIM free method of attaching the gore shape mesh panels to the ribs of a reflector is also disclosed. The attachment method includes bonding the adjoining side edge margins of adjacent gore shape mesh panels in an over and underlapping fashion to an intermediate doubler mesh material which, in turn, is sewn directly to the ribs.

9 Claims, 6 Drawing Sheets

METHOD OF ATTACHING ANTENNA MESH

SPECIFICATION

1. Field of the Invention

The present invention relates generally to electrically conductive mesh material for use as high performance RF reflective antenna surfaces. More particularly, the invention relates to a method for attaching electrically conductive mesh material to the rib members of an antenna structure in a manner which avoids stressing the mesh material resulting in the formation of loose metal-to-metal contacts which can generate passive intermodulation products (PIM).

2. Background of the Invention

A type of interference caused by passive intermodulation products (PIM) occurs in high power radio frequency (RF) communications systems which involve simultaneous transmit and receive operation of RF energy. The problem of PIM generation is particularly acute where the transmit and receive frequencies are closely spaced, which is typically the case for high performance satellite-based systems due to the limited availability of frequency spectrum allocated for a specified communication. The passive metal-to-metal junctions of such satellite-based systems, and in particular, the loose metal junctions of the RF reflective mesh antennae of such satellite-based systems, have been identified as sources of passive intermodulation products (PIM).

The generation of intermodulation products in passive metal-to-metal junctions arises because most metals in air intrinsically posses a thin layer of oxidation which will act as an insulator. When two metal bodies are loosely joined, a metal-insulator-metal interface is produced. Before contact, the insulator acts as a dielectric. As the metal bodies are brought into contact or near contact under pressure, the oxidation layer functions as a semiconductor. Such passive metal-insulator-metal interfaces exhibit nonlinear behavior which will produce interference signals (PIM) that are generated by the combination of harmonics of two adjacent transmit frequencies. When this signal interference or PIM falls within the receive band frequency, system performance is compromised.

Accordingly, the design of a high performance PIM free mesh antenna, and particularly a deployable PIM free mesh antenna, must meet several requirements to ensure against the formation of loose metal-to-metal contacts which will cause PIM. First, the mesh material, in addition to being a good conductor of RF energy, should also be flexible and mechanically pliable to permit wrinkle-free packaging. At the same time, the mesh material should be sufficiently robust such that the individual conductive strands or wires will not kink when folded during stowage or break when loaded in tension during deployment. Further, in order to maintain an accurate reflector surface configuration, the mesh material should also be stretch resistant to prevent sagging.

Prior art mesh antennae are typically constructed from woven synthetic yarns which are spray painted with conductive metallic paint, such as copper paint. It is also known from the prior art how to construct a mesh antenna using thin gage metal wires which are knitted together to form a tricot mesh. Such prior art mesh antenna designs, however, typically exhibit undesirable high in-plane mechanical stiffness and are prone to wrinkling. Further, such designs inherently cause PIM, since the continuity of the metallic coating (in the case of a metal spray coated woven yarns) or the continuity of the metal-to-metal junctions (in the case of knitted metal wires) is difficult to maintain because of the mechanical handling involved in the packaging and the deployment of the reflector.

In the case of a parabolic or dish shaped reflector having a reflective antenna surface composed of a plurality of gore shaped mesh panels, care must be taken when cutting the electrically conductive mesh material into the individual gore shapes in order to avoid the possible generation of PIM sites in the resulting reflective antenna surface. In the usual practice, the mesh material is simply cut along a particular line of geometry without attention to which conductors of the mesh material and in which fashion they are cut. However, in order to prevent the formation of loose metal-to-metal contacts and sparking from occurring between the conductors of the mesh material, it is necessary to ensure that the exposed cut ends of the conductors are maintained at a certain minimum distance spacing from each other.

Further, care must be taken to avoid damage to the individual metal wires or conductive strands of the mesh material when attaching the mesh material to the support ribs of the reflector. In accordance with the conventional practice, the mesh material is attached by sewing the mesh material directly to the support ribs of the antenna structure. This attachment technique results in localized high stress at the points of attachment between the mesh material and the ribs. This will often lead to kinking and/or breakage of individual knitted wires or conductive strands thereby resulting in the formation of loose metal-to-metal contacts and hence PIM.

Accordingly, there is a definite need in the art for an improved electrically conductive mesh material for use as a high performance RF reflective antenna surface which overcomes the problems of the prior art and which by itself does not produce PIM.

Further, there is a need in the art for a method of cutting electrically conductive mesh material into a desired reflector panel shape such that the exposed cut ends of the mesh material are prevented from coming into contact or near contact with other in order to inhibit sparking and generation of PIM.

Further still, there is a need in the art for a method of attaching an electrically conductive mesh material to its supporting structure in such a manner which distributes the stress on the mesh material in the region of attachment over a broader surface area so as to avoid kinking or breakage of individual wires or conductive strands of the mesh material.

SUMMARY OF THE INVENTION

Methods and apparatus which incorporate the desired features described above and which are effective to function as described above constitute specific objects of this invention.

Briefly, the invention discloses an RF reflective mesh material formed from an electrically conductive composite yarn woven in a Leno type weave. The composite yarn is formed by counter-wrapping nonconductive stretch resistant strands about an insulated metal strand and a stretch resistant filler yarn. The insulated metal strand preferably includes a beryllium-copper wire having a diameter in the range of 0.4 to 1.5 mils which is encapsulated by a plastic coating, with a polyamide resin being a preferred plastic. The plastic coating has a thickness sufficient to provide needed electrical isolation of the wire at the weave junctions of the mesh yet not so thick so as to make the encapsulated wire too brittle or rigid. The material selected for use as the stretch resistent counter-wrapping strands and filler yarn preferably include the family of polyester fibers sold under the trademark Dacron. A suitable opaque silicone-based paint is applied to the woven mesh to provide additional electrical isolation at the weave junctions and to protect the Dacron from UV degradation. The paint, being transparent to RF energy, also provides a conductive coating having a surface resistivity on the order of $10^7$ to $10^9$ ohms*in for preventing the accumulation of electro-static charges.

In accordance with a method aspect of the invention, a process for cutting the mesh material into gore shaped reflective mesh panels is disclosed whereby the cut conductive strands of the mesh material are kept at a minimum distance spacing away from one another so as to prevent the formation of loose metal-to-metal contacts known to cause PIM.

In accordance with a second method aspect of the invention, the gore shape mesh panels are attached to the antenna ribs of an antenna structure in a manner which avoids placing localized high stress points on individual strands of the mesh material. The attachment method includes bonding the adjoining side edge margins of adjacent gore shape mesh panels in an over and underlapping fashion to an intermediate doubler mesh material which, in turn, is sewn directly to the antenna rib members. A conductive coating is applied to the edges of the adjoining mesh panels and the doubler material to provide electrical grounding to the rib members and to provide protection against building electro-static charges.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

Figure 5:
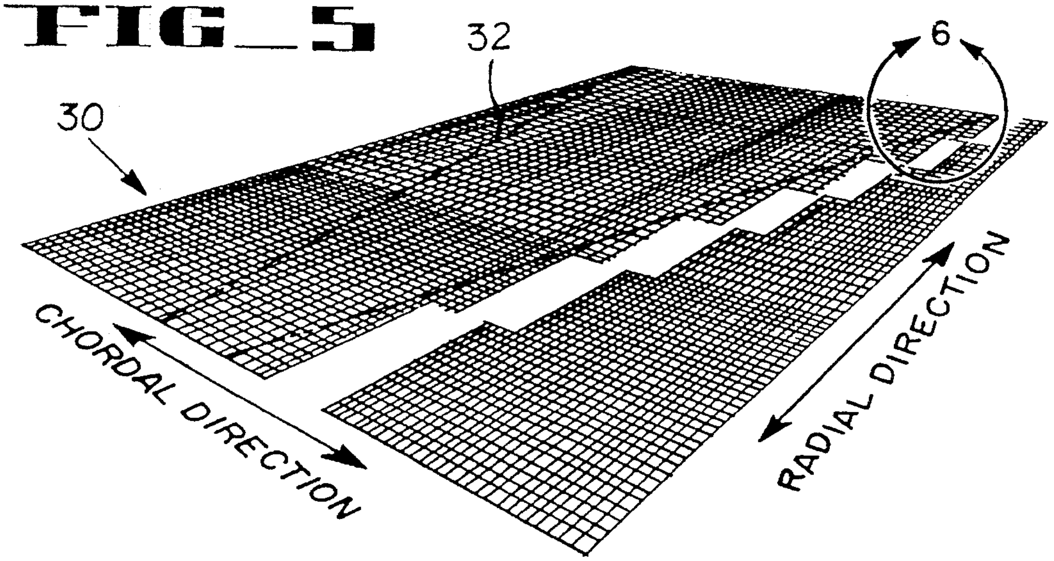
Figure 6:
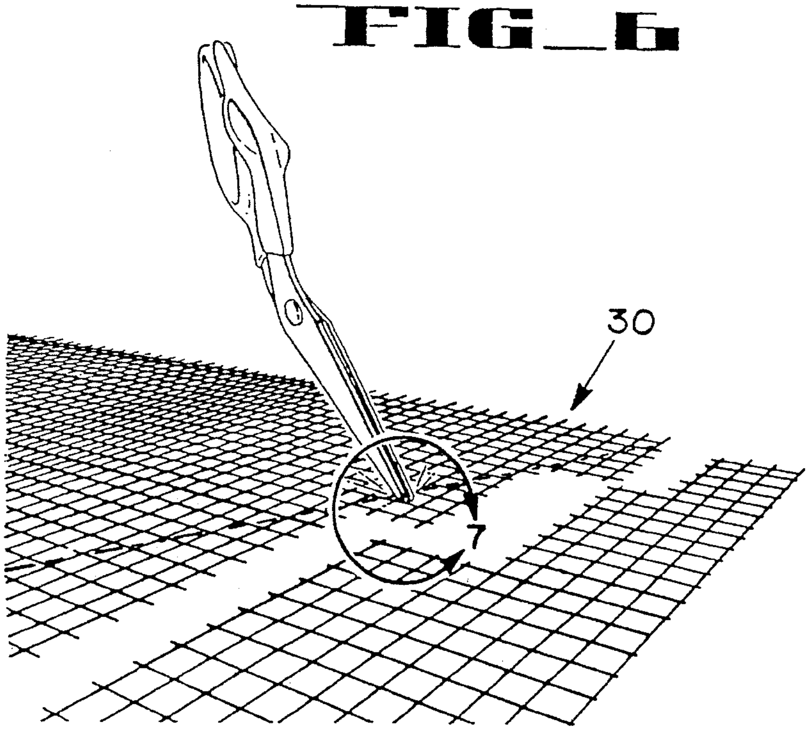

FIGS. 5–6 is a series of perspective views which illustrate the method steps for cutting the electrically conductive mesh material into panel shapes suitable for attachment to the mesh supporting ribs of a radio wave reflector. This series of drawings also illustrates how to cut the mesh material so as to ensure a minimum distance spacing between adjacent cut ends in order to avoid possible metal-to-metal contact or sparking and thereby minimize undesirable generation of passive intermodulation products.

Figure 7:
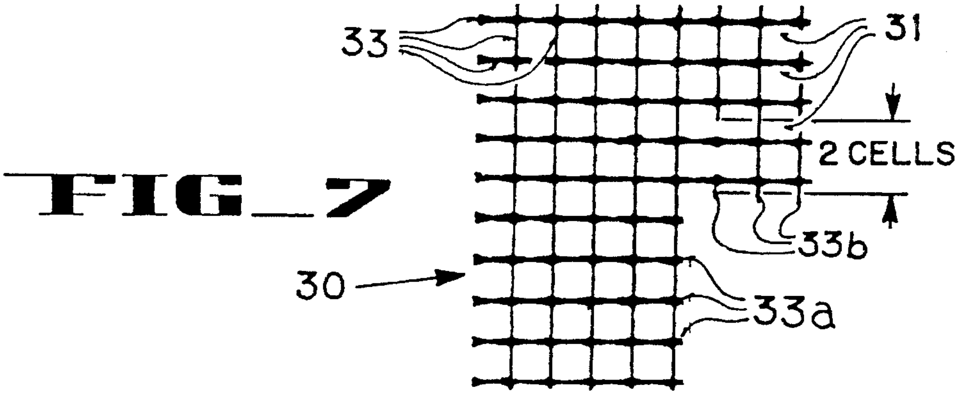

FIG. 7 is an enlarged orthogonal view of the portion of the cut mesh material of FIG. 6 shown encircled by arrow 7 in FIG. 6.

Figure 8:
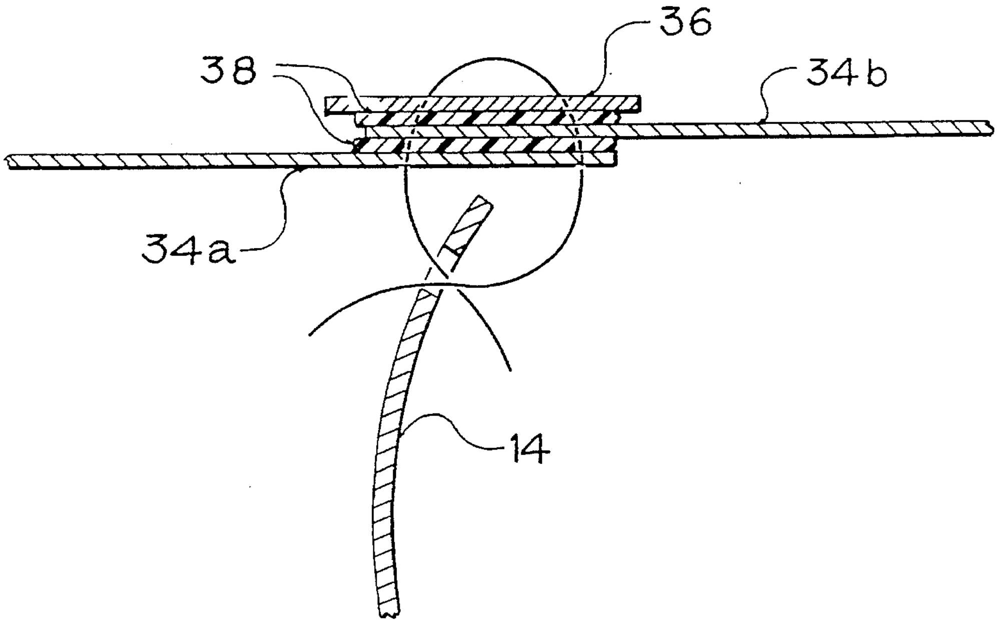
FIG 8 PRIOR ART

FIG. 8 is an enlarged cross section view which illustrates a prior art technique for attaching mesh panels to a support rib of a radio wave reflector.

Figure 9:
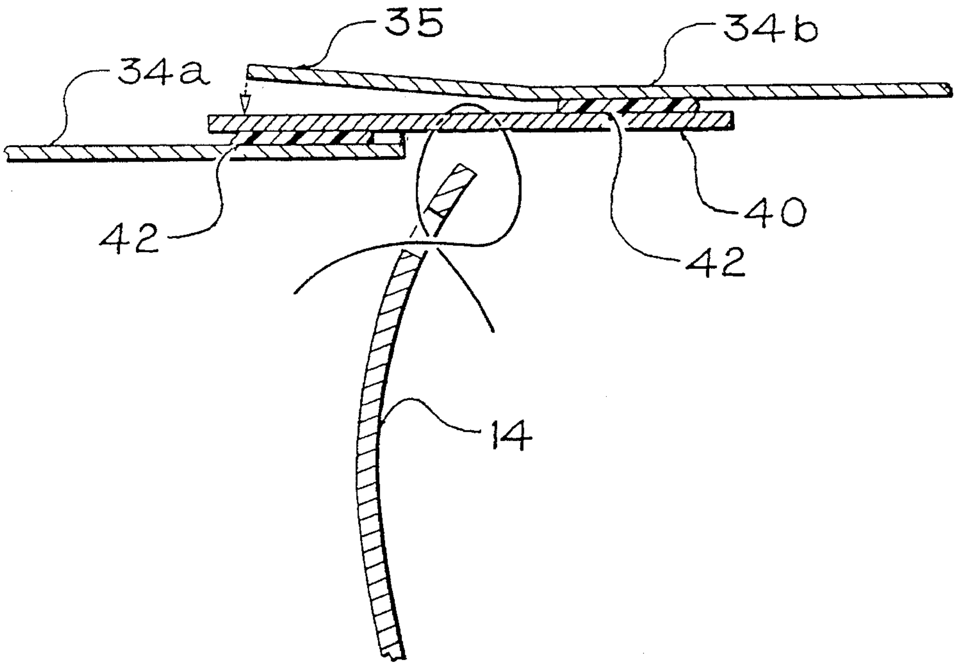
Figure 10:
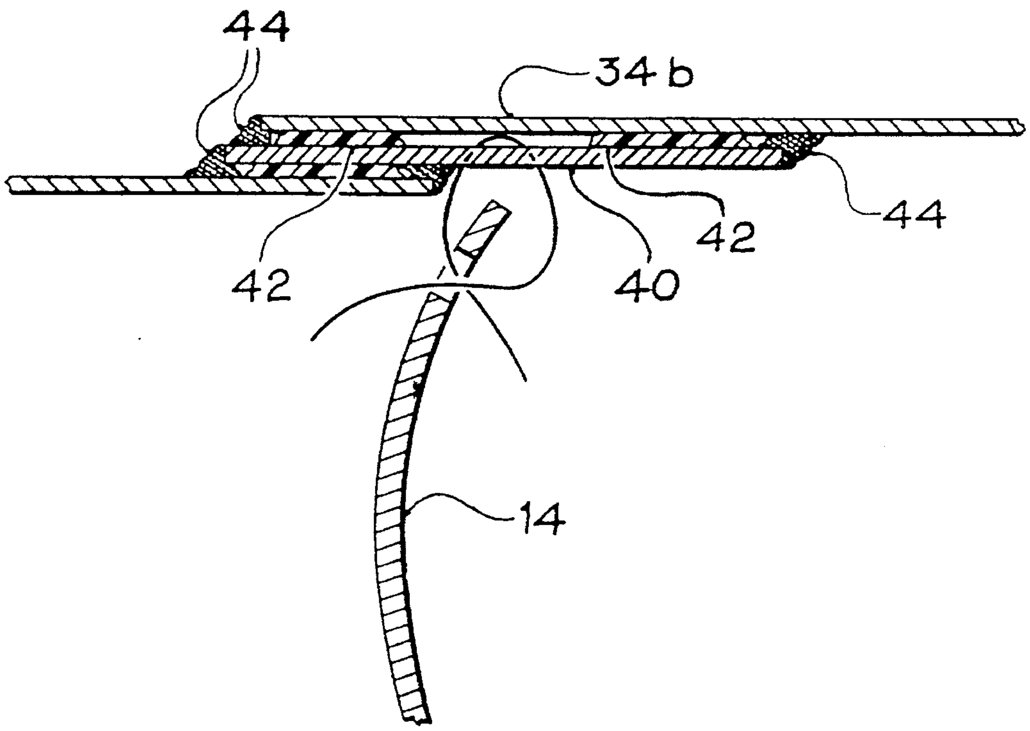

FIGS. 9–10 is a series of enlarged cross section views which illustrate the method of attaching mesh panels to a support rib of a radio wave reflector in accordance with the present invention.

DETAILED DESCRIPTION OF THE PREFERRED EMBODIMENTS

Figure 1A:
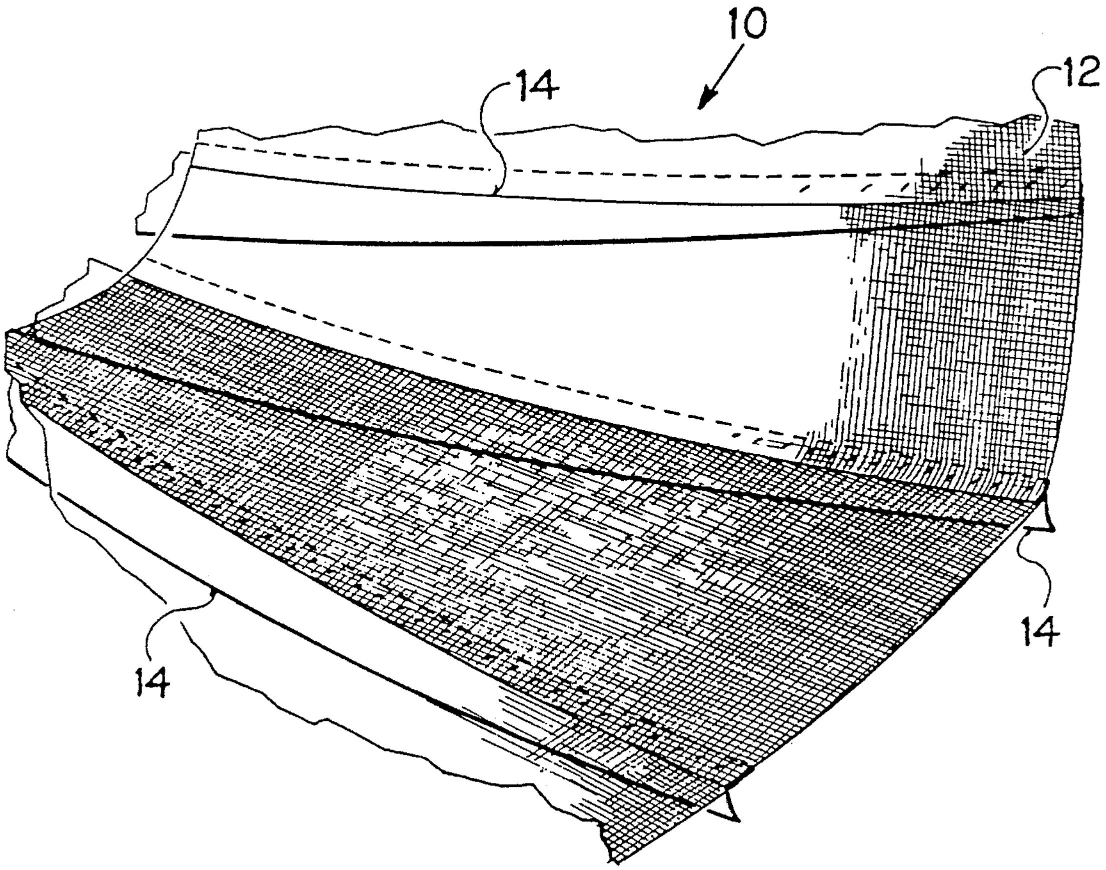
FIG. 1A is a partial perspective view of a mesh radio wave reflector.

FIG. 1A shows an enlarged fragmentary perspective view of a typical parabolic RF reflector 10 in which the improved electrically conductive mesh material of the present invention may be incorporated. As is conventional, the reflector 10 has an open mesh reflector surface 12 comprised of a network of conductors and having a mesh spacing which is predetermined by the frequency of the RF energy to be reflected. In accordance with the conventional practice, the mesh reflector surface 12 is secured to the ribs 14 by sewing.

Figure 1B:
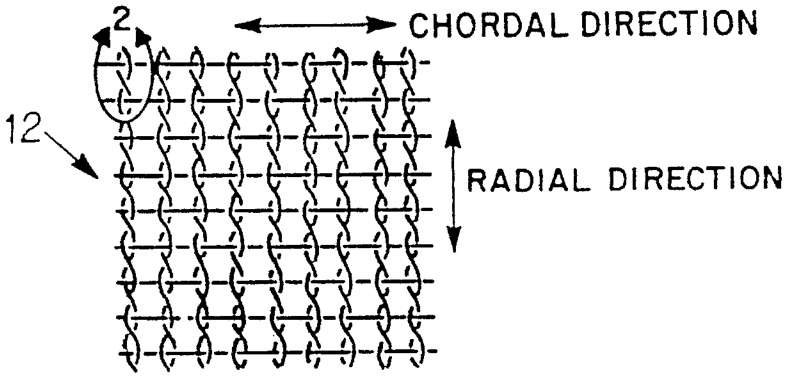
FIG. 1B is a schematic view of a Leno type mesh weave in which the composite yarn of the present invention may be incorporated.

FIG. 1B shows a close up view of the open mesh reflector surface 12 as a Leno or marquisette type weave. The intersecting individual strands of the mesh are oriented substantially parallel to the chordal and radial directions of the mesh panels wherein the chordal direction is taken to be the direction transverse to the ribs 14 and the radial direction refers to the direction parallel to the ribs 14.

Figure 2:
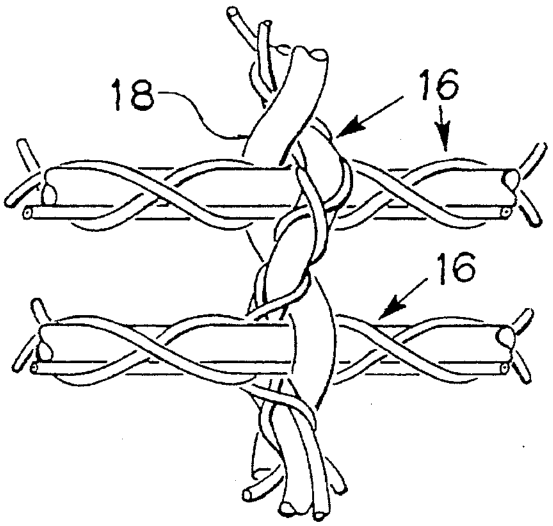
FIG. 2 is an enlarged fragmentary view of the portion of the mesh weave of FIG. 1B shown encircled by arrow 2 in FIG. 1B.

FIG. 2 shows an enlarged view of the region of the open mesh 12 encircled by arrow 2 of FIG. 1B. The open mesh 12 comprises a plurality of electrically conductive composite yarns 16 which are oriented in both the chordal and radial directions. Additional interwoven nonconducting or substantially nonconducting yarns 18 are intertwined with the composite yarns 16 along the radial direction to complete the mesh construction as shown.

Figure 3:
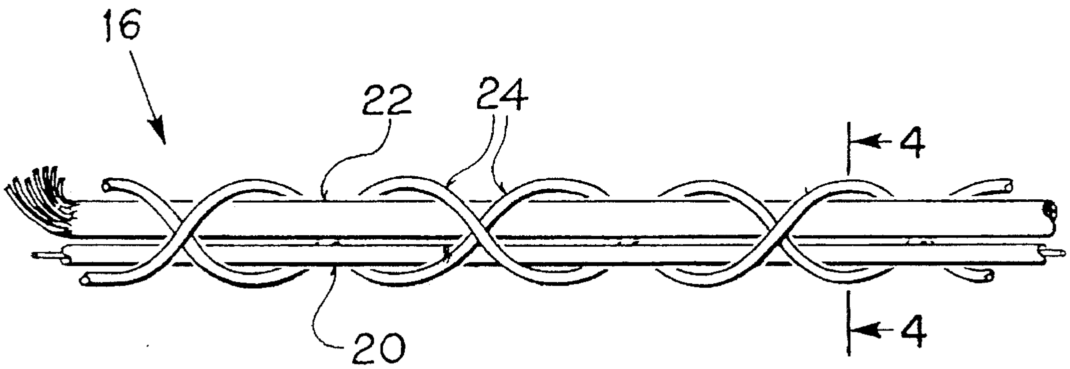
FIG. 3 is an enlarged view illustrating the detail of the composite yarn of the present invention.
Figure 4:
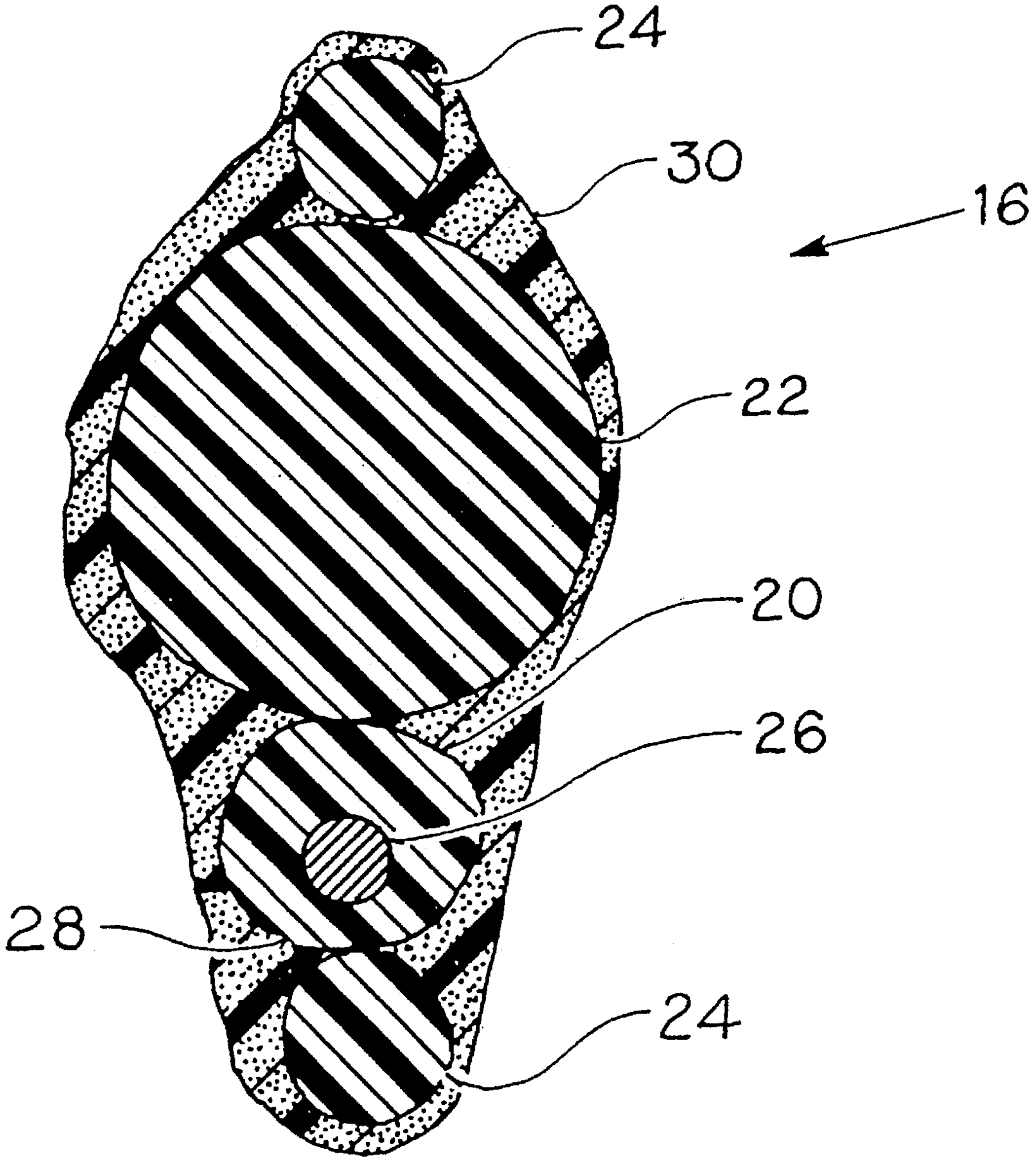
FIG. 4 is an enlarged cross section view taken along the line and in the direction of arrows 4—4 of FIG. 3.

Referring now to FIGS. 3–4, each electrically conductive composite yarn 16 comprises an insulated metal strand or wire 20 and a stretch resistant filler yarn 22. The insulated wire 20 and stretch resistant filler yarn 22 are bound together by additional stretch resistant yarns 24 which are applied in counter-wrapping fashion, with a counter-wrap of 10 turns per inch being preferred.

The insulated wire 20 is preferably a flexible, thin gauge beryllium-copper wire 26 having a diameter on the order of 0.4 to 1.5 mils, with 1.2 mils being a preferred diameter. The wire 26 is encapsulated within a thin plastic coating 28 having a coating thickness sufficiently thick to provide the necessary electrical isolation at the wire junctions in the mesh yet not so thick as to render the insulated wire 16 too stiff or brittle or otherwise unsuitable for use in forming a flexible mesh material.

Selection of a suitable plastic for encapsulating the thin gauge beryllium-copper wire 26 thus entails evaluation of the following characteristics: ease of application as a thin coating; extrusion temperature; insulating capability; flexibility; and resistance to aging and material degradation in an extreme radiation environment.

Especially suitable plastics include polyamide resins. A minimum coating thickness of 0.3 mils has been found to be sufficient to provide 100% electrical isolation. The coating thickness should, however, not exceed 0.5 mils as the insulated wire then becomes too stiff and brittle and may break or kink during normal mechanical handling operations of the mesh material, i.e. during packaging into the stowed position and also during deployment. Polyamide coated Be—Cu wires which have been found suitable for use in the present invention are available through the PMC Corporation of New Hampshire.

Suitable materials for use as the stretch resistant filler yarn 22, counter-wrapping yarns 24 and weave yarns 18 include the family of polyester fibers sold under the trademark Dacron, with 125 denier Dacron being preferred for the filler yarn 22 and 70 denier Dacron being preferred for the counter-wrapping yarns 24. 125 denier Dacron, for example, when used as the filler yarn 22 has been found to be effective to provide the necessary strain relief to the composite yarns 16 and thereby protect the insulated wires 20 from strain related damage (e.g. stretching or breaking) for normal loading conditions experienced by the mesh (e.g. tension loads experienced by the chordal yarns during deployment of the mesh antenna). Thus, the stretch resistant filler yarns 22 substantially reduce the formation of a loose metal-to metal contact normally associated with discontinuities or damaged conductors in the mesh material and hence substantially reduce the possible locations where PIM may occur in the mesh.

As best seen in FIG. 4, the composite yarn 16 is sprayed with an opaque silicone-based paint 30 to protect the Dacron fibers against degradation from UV radiation and also to provide additional electrical isolation at the weave junctions of the mesh. The silicone-based paint 30 further provides a conductive coating having a surface resistivity sufficiently low to facilitate bleed off of static charges which tend to accumulate along the reflective surface of the mesh. A surface resistivity in the range of about $10^7$ to about $10^9$ Ohms*in is sufficient to provide the desired electrostatic discharge capability while still remaining transparent to RF energy for achieving a desired level of mesh conductivity. A suitable silicone-based paint for use in the present invention is produced by McGhan NuSil of Carpenteria, Calif.

With reference now to FIGS. 5–7, the PIM free mesh cutting method aspect of the invention will now be described. FIG. 5 shows an electrically conductive open mesh 30 on which a gore shape pattern 32 has been marked. The electrically conductive open mesh 30 is advantageously formed from the PIM free electrically conductive composite yarns 16 as discussed above. However, it is understood that the mesh cutting method of the present invention may also be used to cut other electrically conductive mesh antenna designs of the prior art and still provide improved PIM performance.

The open mesh 30 is cut through the cells 31 parallel to the electrically conductive strands 33 such that exposed cut ends 33*a* in the chordal direction are not in close proximity to exposed cut ends 33*b* in the radial direction. When cutting along a diagonal, the cut is made in a stair step fashion.

As best seen in FIGS. 7–8, at each inside corner where a chordal cut strand 33*a* is separated by less than one cell width from an adjacent radial cut strand 33*b*, one of the chordal or radial cut strands is cut back at a distance, preferably two cell widths (see e.g. FIG. 8), and is removed. This provides a distance spacing between the cuts ends of the conductive strands sufficient to prevent both sparking and the formation of loose metal-to-metal contacts known to cause PIM.

The cut ends are also preferably cut short such that they are close to a junction with an intersecting strand. This is done to prevent the exposed cut end of a free conductive strand from curling back onto itself or onto adjacent conductive strands of the mesh.

Once cut, the cut ends are then coated with a sealant to seal and electrically isolate the exposed cut ends. Suitable sealants include the line of low outgasing silicone sealants sold by the Dow Corning Corporation. A silicone sealant when used in the prescribed manner also provides some mechanical rigidity to the cut ends which further aids in preventing the cut ends from curling or bending backwards and contacting the other conductive strands of the mesh.

With reference now to FIGS. 8–10, the method of attaching the electrically conductive mesh material to the support ribs of an antenna structure will now be described. The following description illustrates, by way of example, an antenna mesh attachment technique for attaching pre-cut gore shape mesh panels to the support ribs of a parabolic reflector. For best PIM performance, the preferred electrically conductive mesh material incorporates the composite yarns 16 woven in a Leno type weave as described above and has been cut into the gore shapes in accordance with the mesh cutting method as described above.

FIG. 8 illustrates a prior art mesh antenna attachment technique wherein the overlapping side edge margins of adjacent mesh panels 34*a*, 34*b* are seamed together along with an additional top layer doubler material 36 by intermediate glue layers 38. The resulting glued seam is then stitched to the rib 14. To maintain the continuity of the RF reflector surface, the doubler material 36 preferably consists of the same electrically conductive mesh material as the adjacent mesh panels 34. One adverse consequence of such a mesh attachment technique is the localized high stress present at the points of attachment between the electrically conductive mesh material and the ribs. The localized high stress will promote kinking and/or breakage of individual conductive strands of the mesh thereby resulting in the formation of loose metal-to-metal contacts which are known to cause PIM.

FIGS. 9–10 illustrate the mesh attachment method of the present invention whereby the formation of localized high stress region on the electrically conductive mesh material is substantially reduced thereby improving the PIM performance of the mesh antenna. The mesh attachment method of the present invention utilizes an intermediate doubler flap of RF nonreflective mesh material 40 as an attaching medium for securing the common side edge margins of adjacent mesh panels 34*a*, 34*b* to the rib 14. The doubler flap 40 includes left and right side margins and a middle portion. The left side margin is first overlapped onto an adjacent side edge margin of mesh panel 34*a* and is secured in place by a suitable glue bond 42. Next, a second mesh panel 34*b* is then overlaid onto the doubler flap 40 and is secured to the right side margin of the doubler flap 40 by glue bond 42 leaving an unsecured flap portion 35 which extends over the width of the doubler flap 40. The middle portion is then sewn directly to the rib thereby alleviating the prior art problem of high localized stresses placed directly on the mesh panels 34*a*, 34*b*. Alternatively, the middle portion of the doubler flap 40 may be sewed to the rib 14 before the left and right side margins are glued to the respective mesh panels 34*a* and 34*b*.

As seen in FIG. 10, after the initial gluing and sewing steps have been performed, the originally unsecured flap portion 35 of the overlying mesh panel 34*b* is then glued to the left side margin of doubler flap 40 by glue bond 42 to form a continuous RF reflective surface between the two mesh panels 34*a*, 34*b*. Additional electrically conductive silicone-based paint 44 may be applied to the side edge margins of the mesh panels 34*a*, 34*b* to provide a desired electro static discharge capability as well as to provide some mechanical rigidity to the cut conductive strands so as to prevent them from curling or bending such that they might form loose metal-to-metal contacts with other portions of the mesh material.

The doubler flap 40 preferably comprises a Dacron mesh material which has been pretreated with a conductive coating (e.g. using the silicone-based paint as discussed above) to provide electrical grounding from the electrically conductive mesh panels 34*a*, 34*b* to the rib 14. In this design, the localized high stress regions are contained within the middle portion of the doubler flap 40 thus substantially reducing the formation of broken conductive strands in the over and underlapping portions of the mesh panels 34*a*, 34*b*.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

I claim:

1. A method of attaching electrically conductive mesh material in the form of gore shape mesh panels to the rib members of an RF antenna structure to form a parabolic RF reflector surface and which avoids placing localized high stress on the electrically conductive mesh material which can damage the mesh material and cause passive intermodulation products (PIM), the method comprising the steps of:

a) providing a doubler flap comprising nonconductive mesh material, said doubler flap having a left side margin, a middle portion and a right side margin, each of said left side margin, said middle portion and said right side margin having a top and bottom surface;

b) gluing a right side margin of a first gore shape electrically conductive mesh panel to the bottom surface of the left side margin of the doubler flap;

c) overlapping a left side margin of a second gore shape electrically conductive mesh panel over both the left and right side margins of the doubler flap such that said first and second gore shape mesh panels form a continuous RF reflective surface;

d) gluing the upper surface of the right side margin of the doubler flap to an overlying portion of the left side margin of the second gore shape mesh panel;

e) attaching the middle portion of the doubler flap to an antenna rib member;

f) gluing the upper surface of the left side margin of the doubler flap to an overlying portion of the left side of the second gore shape mesh panel; and g) repeating steps a) through f) for each of rib member of the antenna structure until a parabolic reflector surface is formed.

2. A method according to claim 1 wherein said step of attaching the middle portion of the doubler flap includes sewing.

3. A method according to claim 1 which includes the step of applying a coating of electrically conductive paint to the doubler flap to provide an electrical ground from the mesh panels to the rib.

4. A method according to claim 2 which includes the step of applying a coating of electrically conductive paint to the doubler flap to provide an electrical ground from the mesh panels to the rib.

5. A method according to claim 3 which includes the step of applying an RF energy transparent silicone-based sealant to the side margins of the gore shape mesh panels to provide mechanical rigidity to cut conductive strands disposed along the side margins of the mesh panels in order to prevent them from curling and loosely contacting other portions of the mesh panels.

6. A method according to claim 4 which includes the step of applying an RF energy transparent silicone-based sealant to the side margins of the gore shape mesh panels to provide mechanical rigidity to cut conductive strands disposed along the side margins of the mesh panels in order to prevent them from curling and loosely contacting other portions of the mesh panels.

7. A method of attaching electrically conductive mesh material in the form of gore shape mesh panels to the rib members of an RF antenna structure to form a parabolic RF reflector surface and which avoids placing localized high stress on the electrically conductive mesh material which can damage the mesh material and cause passive intermodulation products (PIM), the method comprising the steps of:

a) providing a doubler flap of nonconductive mesh material having a left side margin, a middle portion and a right side margin, each of said left side margin, said middle portion and said right side margin having a top and bottom surface;

b) sewing the middle portion of the doubler flap to an antenna rib member;

c) gluing a right side margin of a first gore shape electrically conductive mesh panel to the bottom surface of the left side margin of the doubler flap;

d) overlapping a left side margin of a second gore shape electrically conductive mesh panel over both the left and right side margins of the doubler flap such that said first and second gore shape mesh panels form a continuous RF reflective surface;

e) gluing the overlapping left side margin of the second gore shape mesh panel to the upper surfaces of the left and right side margins of the doubler flap; and f) repeating steps a) through f) for each rib member of the antenna structure until a parabolic reflector surface is formed.

8. A method according to claim 7 which includes the step of applying a coating of electrically conductive paint to the doubler flap to provide an electrical ground from the mesh panels to the rib.

9. A method according to claim 8 which includes the step of applying an RF energy transparent silicone-based sealant to the side margins of the gore shape mesh panels to provide mechanical rigidity to cut conductive strands disposed along the side margins of the mesh panels in order to prevent them from curling and loosely contacting other portions of the mesh panels.

* * * * *